(12) United States Patent
Wang

(10) Patent No.: US 12,510,405 B2
(45) Date of Patent: Dec. 30, 2025

(54) TRAILER LIGHT DETECTOR APPLICABLE TO MULTIPLE TYPES AND DETECTION METHOD THEREOF

(71) Applicant: Jinghan Wang, Shouguang (CN)

(72) Inventor: Jinghan Wang, Shouguang (CN)

( * ) Notice: Subject to any disclaimer, the term of this patent is extended or adjusted under 35 U.S.C. 154(b) by 0 days.

(21) Appl. No.: 19/276,308

(22) Filed: Jul. 22, 2025

(65) Prior Publication Data

US 2025/0347557 A1 Nov. 13, 2025

(51) Int. Cl.
  *G01J 1/44* (2006.01)
  *G01J 1/02* (2006.01)
(52) U.S. Cl.
  CPC ............... *G01J 1/44* (2013.01); *G01J 1/0252* (2013.01)
(58) Field of Classification Search
  CPC .................................. G01J 1/44; G01J 1/0252
  See application file for complete search history.

(56) References Cited

U.S. PATENT DOCUMENTS 8,723,344 B1 * 5/2014 Dierickx ............... B60K 25/08
290/1 R

* cited by examiner

*Primary Examiner* — Georgia Y Epps
*Assistant Examiner* — Don J Williams
(74) *Attorney, Agent, or Firm* — Daniel M. Cohn; Howard M. Cohn

(57) ABSTRACT

The present disclosure relates to the field of trailer light detection technology, and discloses a trailer light detector applicable to multiple types and a detection method thereof. The trailer light detector applicable to multiple types comprises: a housing component including a lower shell and an upper shell fixedly connected by assembly screws, wherein a handle holder and a handle detachably connected thereto are provided on a top of the housing; a circuit board component disposed inside the housing, including a power module, a detection branch, a relay, a remote controller, an IP2326 chip, an STC chip, an antenna, a GND ground terminal and a circuit module, wherein the power module is electrically connected to a battery module, the detection branch is connected to a trailer light interface through the relay, and the GND ground terminal is fixedly connected to a ground circuit of the circuit board component to provide stable ground protection.

6 Claims, 5 Drawing Sheets

TRAILER LIGHT DETECTOR APPLICABLE TO MULTIPLE TYPES AND DETECTION METHOD THEREOF

The present disclosure relates to the technical field of trailer light detection, in particular to a trailer light detector applicable to multiple types and a detection method thereof.

BACKGROUND

As a critical connection between the vehicle and trailer, the proper functioning of trailer lights is paramount to road safety. Particularly under nighttime or adverse weather conditions, the brightness, flashing frequency, and stability of trailer lights directly influence the perception and reaction time of other road users, making operational reliability essential. However, prolonged exposure to vibrations, moisture, dust, and other environmental stressors during vehicle operation can degrade light performance or cause failures, posing a latent safety hazard.

Current trailer light detection methods and devices on the market exhibit significant limitations. Most existing solutions can only detect basic on-off functionality, failing to accurately assess critical performance indicators such as flashing frequency and brightness. Given that trailer light operation frequencies and voltages may vary due to multiple factors, conventional on-off state detection is insufficient to reflect true operational conditions-particularly for specialized lights (e.g., flash lights and turn signals), where traditional methods cannot comprehensively evaluate frequency stability, response time, or the like Existing trailer light detection devices predominantly suffer from the following critical drawbacks: operational complexity requiring specialized training and extended learning periods, which causes accessibility barriers for routine user inspections, and increases the difficulty and cost of the detection process; bulky designs that compromise portability, limiting deployment flexibility for vehicle owners and field technicians in practical applications; and excessive space requirements that hinder spontaneous roadside diagnostics for field detection, failing to meet the demands of dynamic field detection scenarios.

Therefore, based on the above technical problems, it is necessary for technicians in the art to develop a trailer light detector applicable to multiple types and a detection method thereof.

SUMMARY OF THE APPLICATION

The objective of the present disclosure is to provide a trailer light detector applicable to multiple types and a detection method thereof, so as to solve the problems in the above background technology.

In order to achieve the above objective, the present disclosure provides the following technical solutions:

A trailer light detector applicable to multiple types, comprising:
- a housing component including a lower shell) and an upper shell fixedly connected by assembly screws, wherein a handle holder and a handle detachably connected thereto are provided on a top of the housing;
- a circuit board component disposed inside the housing, including a power module a detection branch, a relay, a remote controller, an IP2326 chip, an STC chip, an antenna, a GND ground terminal and a circuit module, wherein the power module is electrically connected to a battery module, the detection branch is connected to a trailer light interface through the relay, and the GND ground terminal is fixedly connected to a ground circuit of the circuit board component to provide stable ground protection;
- an operation component including a switch key, a plurality of keys and a charging port disposed on a surface of the housing, wherein the plurality of keys are in signaling connection with the STC chip; and
- an interface component including a small socket and a large interface; wherein a small socket protection cover is disposed on an outer side of the small socket and fixed by an anti-drop connection strip; and a large interface protection cover and a protection cover base are disposed on an outer side of the large interface.

Preferably, the circuit board component further includes an NTC thermistor pad assembly and a diode, the NTC thermistor pad assembly is configured to monitor a circuit board temperature, and the diode is connected in series with the detection branch to provide reverse current protection.

Preferably, the power module includes a DC-DC buck voltage regulator circuit, an input end of the DC-DC buck voltage regulator circuit is connected to the battery module, and an output end of the DC-DC buck voltage regulator circuit is connected to the IP2326 chip to provide a stable voltage.

Preferably, the detection branch includes a plurality of independent detection channels, each of the plurality of independent detection channels is switched to be connected to a different functional interface of a trailer light through a relay, and the STC chip controls an on-off state of the relay based on an instruction input by the keys.

Preferably, the antenna is connected to a wireless communication module of the STC chip to transmit detection data to an external terminal device in real time.

Preferably, the small socket and the large interface are respectively adapted to different types of trailer light plugs, and the protection cover base of the large interface is fixed to the housing by a snap-fit structure.

A detection method for a trailer light detector applicable to multiple types, comprising:
- S1, connecting the detector to the trailer light through the small socket or the large interface;
- S2, selecting a type and a function mode of the trailer light to be detected by the keys, and the STC chip controlling the relay to switch to a corresponding detection channel;
- S3, the detection branch collecting a brightness, a flashing frequency and voltage data of the trailer light, and performing signal processing through the IP2326 chip; and
- S4. the STC chip analyzing processed data to determine whether the trailer light operates normally, and sending a result to an external terminal through the antenna.

Preferably, in the step S3, the detection branch monitors the circuit board temperature in real time through the NTC thermistor pad assembly, and in response to the temperature exceeding a threshold, the STC chip, is triggered to interrupt detection and issue an alarm.

Preferably, in the step S4, the external terminal device receives the detection data through wireless communication and generates a detection report including a brightness curve, a frequency waveform and a fault code.

Preferably, during a detection process, the detector maintains a stable output of the power module through the DC-DC buck voltage regulator circuit to ensure detection accuracy.

Compared with the prior art, the present disclosure has the following beneficial effects:

(1) According to the trailer light detector applicable to multiple types and the detection method thereof of the present disclosure. By setting the small socket and the large interface adapted to different trailer light plugs, users do not need to purchase special equipment for different vehicle models or lamp types, which significantly reduces the use cost and improves the detection efficiency.

(2) According to the trailer light detector applicable to multiple types and the detection method thereof of the present disclosure, the STC chip is configured to control the relay to switch the detection channel. Combined with the signal processing function of the IP2326 chip, the key parameters such as the brightness, flickering frequency and voltage of the trailer light can be accurately measured, which solves the limitation that traditional equipment can only detect on and off state. The present disclosure is particularly suitable for the comprehensive evaluation of complex function lamps such as turn signals and flash lights.

(3) According to the trailer light detector applicable to multiple types and the detection method thereof of the present disclosure, by selecting the detection mode with the keys and cooperating with the wireless communication module (antenna) to transmit data to the external terminal in real time, the users can quickly obtain the detection report containing the brightness curve, the frequency waveform and the fault code, which greatly reduces the operation threshold and meets the needs of non-professionals.

(4) According to the trailer light detector applicable to multiple types and the detection method thereof of the present disclosure, the built-in NTC thermistor pad assembly monitors the circuit board temperature in real time. When the temperature exceeds the threshold, the detection is automatically interrupted and an alarm is triggered, effectively avoiding overheating and damage to the equipment. The diode is connected in series with the detection branch to provide reverse current protection, further enhancing the stability and safety of the equipment.

(5) According to the trailer light detector applicable to multiple types and the detection method thereof of the present disclosure, the DC-DC buck voltage regulator circuit is adopted to ensure that the battery module outputs a stable voltage during the detection process, which avoids measurement errors caused by power supply fluctuations, thereby significantly improving the accuracy of the detection result.

Reference signs in the figures: 11, lower shell; 12, upper shell; 13, assembly screws; 14, handle holder; 15, handle; 2, circuit board component; 201, NTC thermistor pad assembly; 202, diode; 203, battery module; 204, power module; 205, GND ground terminal; 206, IP2326 chip; 207, STC chip; 208, circuit module; 209, detection branch; 210, relay; 211, remote control; 21, antenna; 22, switch key; 23, keys; 24, charging port; 3, small socket; 31, small socket protection cover; 32, anti-drop connection strip; 4, large interface; 41, large interface protection cover; 42, protection cover base.

DETAILED DESCRIPTION

The features and exemplary embodiments of various aspects of the present disclosure will be described in detail below. In order to make the objective, technical solutions and advantages of the present disclosure clearer, the present disclosure will be further described in detail below in conjunction with the accompanying drawings and specific embodiments. For those skilled in the art, the present disclosure can be implemented without the need for some of these specific details. The following description of the embodiments is only intended to provide a better understanding of the present disclosure by illustrating examples of the present disclosure.

Figure 1:
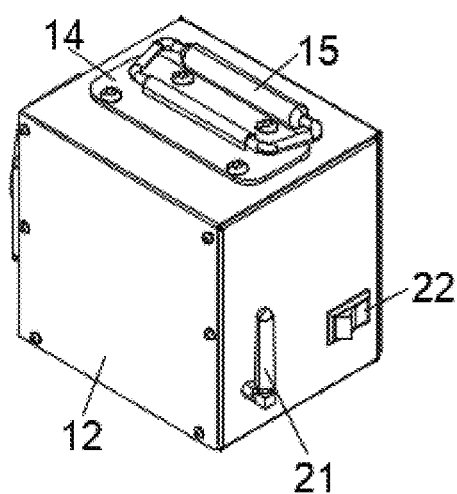
FIG. 1 is a schematic diagram of an overall structure of a trailer light detector applicable to multiple types and a detection method thereof.
Figure 2:
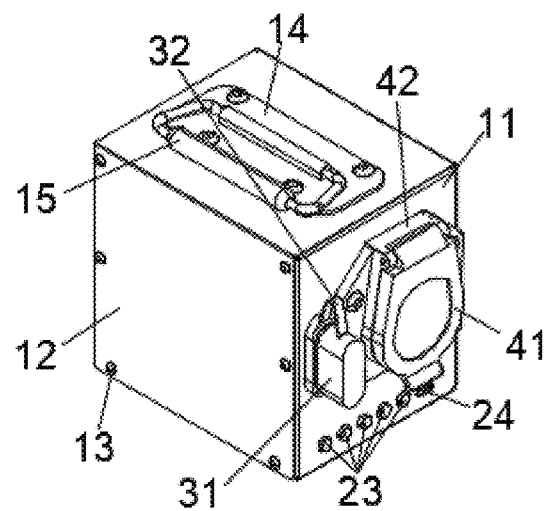
FIG. 2 is a schematic diagram of a rear view of a trailer light detector applicable to multiple types and a detection method thereof.
Figure 3:
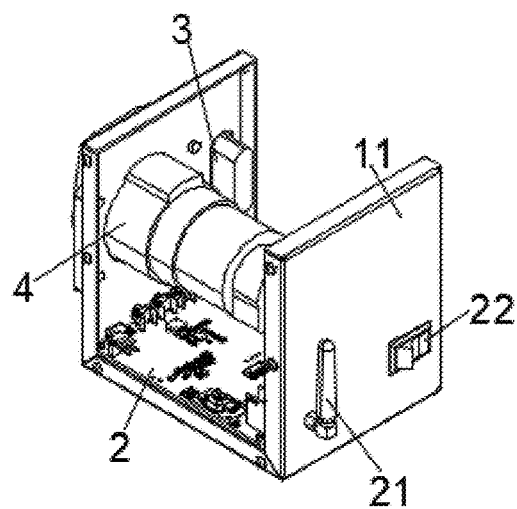
FIG. 3 is a schematic diagram of an internal structure of a trailer light detector applicable to multiple types and a detection method thereof.
Figure 4:
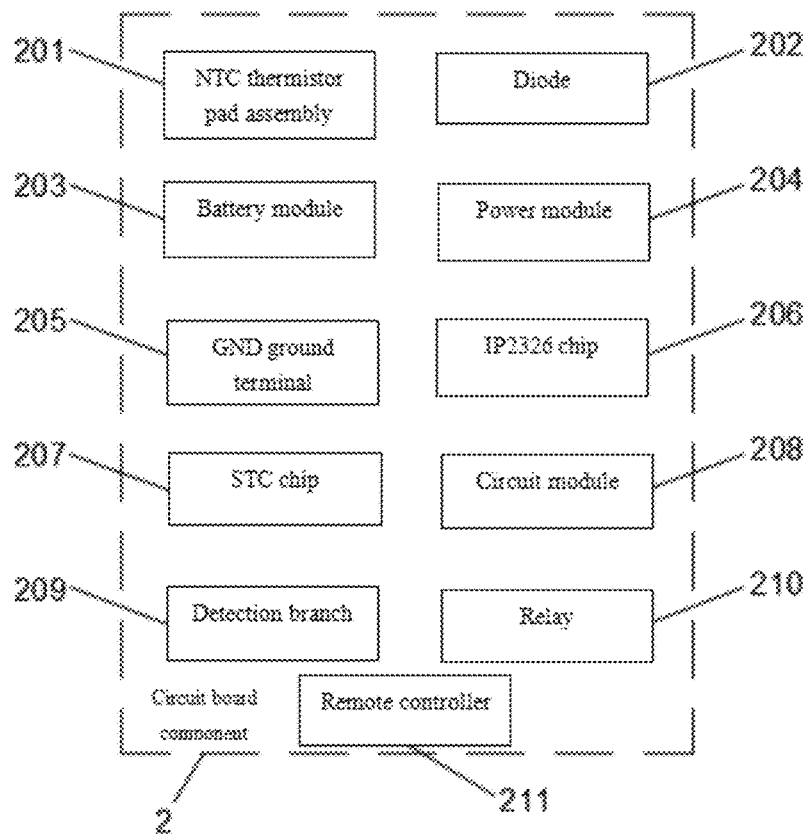
FIG. 4 is a schematic diagram of a circuit board component of a trailer light detector applicable to multiple types and a detection method thereof.
Figure 5:
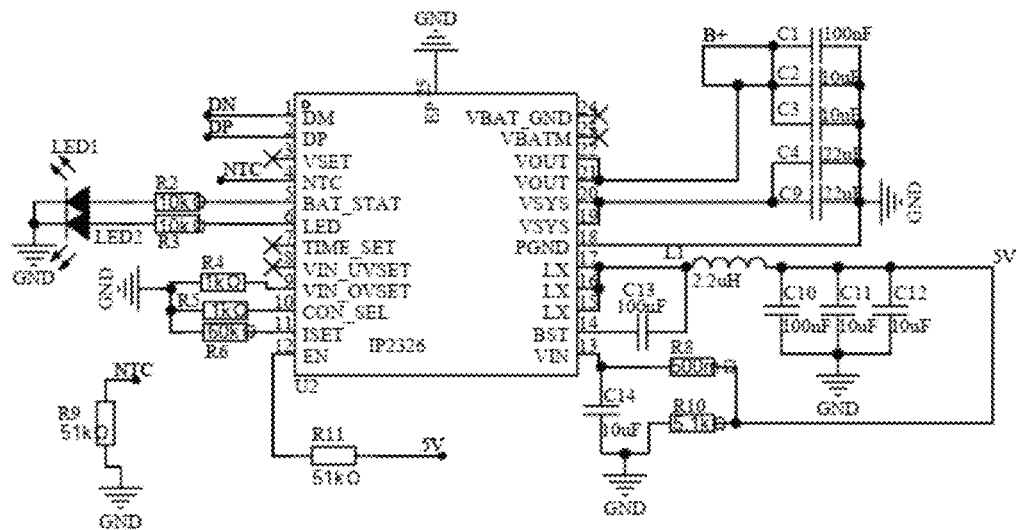
FIG. 5 is a schematic diagram of a battery charging circuit of a trailer light detector applicable to multiple types and a detection method thereof.
Figure 6:
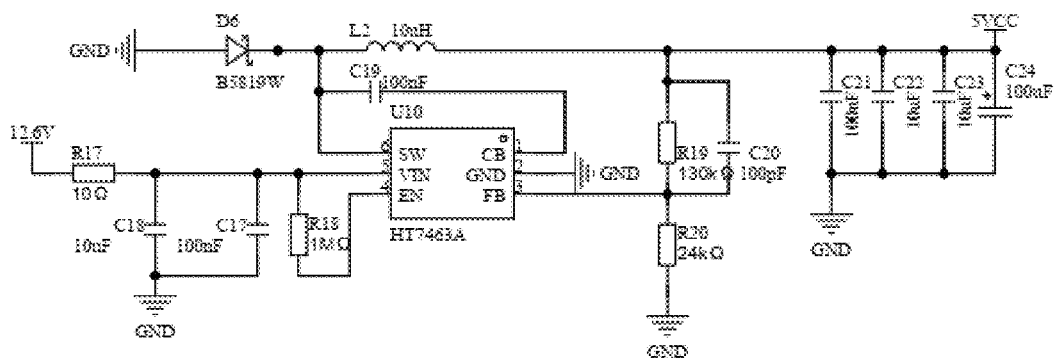
FIG. 6 is a schematic diagram of a DC-DC buck voltage regulator circuit of a trailer light detector applicable to multiple types and a detection method thereof.
Figure 7:
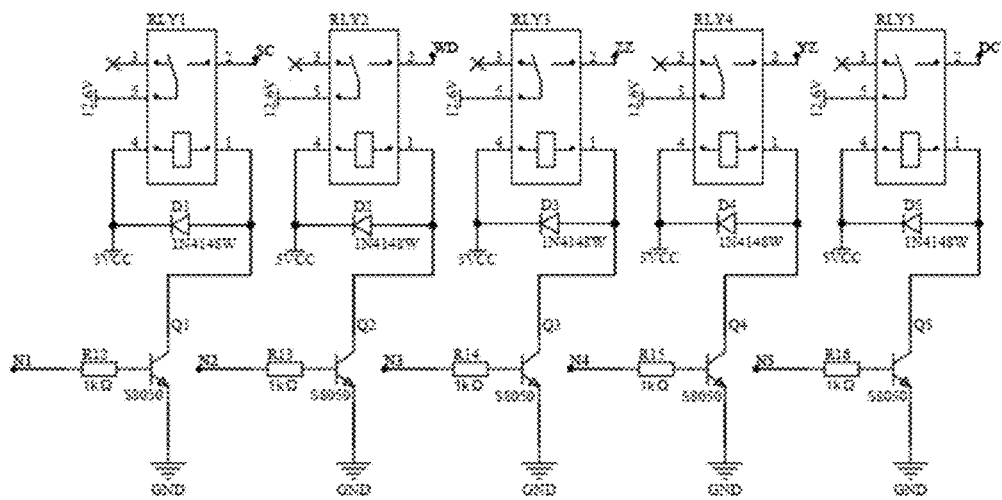
FIG. 7 is a schematic diagram of a relay control circuit of a trailer light detector applicable to multiple types and a detection method thereof.
Figure 8:
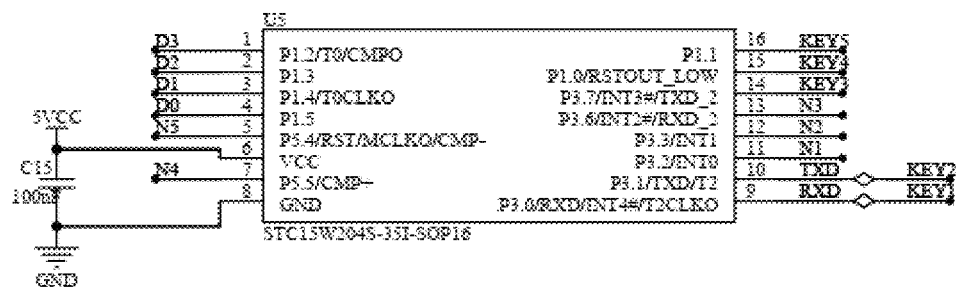
FIG. 8 is a schematic diagram of a an MCU and wireless receiving circuit of a trailer light detector applicable to multiple types and a detection method thereof.
Figure 8:
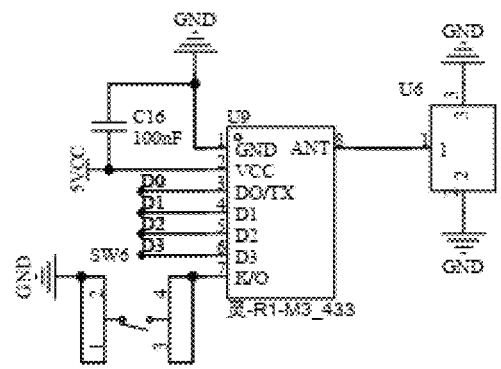
Figure 9:
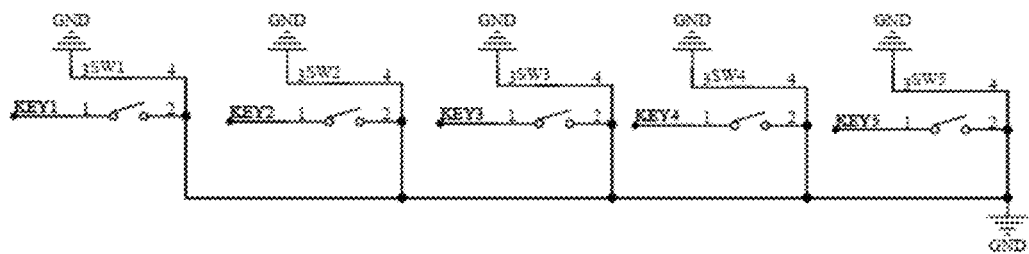
FIG. 9 is a schematic diagram of a key circuit of a trailer light detector applicable to multiple types and a detection method thereof.

As shown in FIGS. 1-9, the present disclosure provides a technical solution of a trailer light detector applicable to multiple types: comprising a housing component, the housing component including a lower shell 11 and an upper shell 12 fixedly connected by assembly screws 13. A handle holder 14 and a handle 15 detachably connected thereto are provided on a top of the housing, which is convenient for a user to carry and operate.

A circuit board component 2 is disposed inside the housing, including a power module 204, a detection branch 209, a relay 210, a remote controller 211, an IP2326 chip 206, an STC chip 207, an antenna 21, a GND ground terminal 205 and a circuit module 208. The power module 204 is electrically connected to a battery module 203 to supply power to the detector. The detection branch 209 is connected to a trailer light interface through the relay 210 to realize detection of a trailer light. The relay 210 is configured to switch to a corresponding detection mode, collect a feedback signal of the remote controller 211, and implements/a brightness, a flashing frequency, a color, or the like, of the trailer light based on the signal. The GND ground terminal 205 is fixedly connected to a ground circuit of the circuit board component 2 to provide stable ground protection.

An operation component includes a switch key 22, a plurality of keys 23 and a charging port 24 disposed on a surface of the housing. The plurality of keys 23 are in signaling connection with the STC chip 207 for the user to input an operation instruction.

An interface component includes a small socket 3 and a large interface 4. A small socket protection cover 31 is disposed on an outer side of the small socket 3 and fixed by an anti-drop connection strip 32. A large interface protection cover 41 and a protection cover base 42 are disposed on an outer side of the large interface 4. The small socket 3 and the large interface 4 are respectively adapted to different types of trailer light plugs. The protection cover base 42 is fixed to the housing through a snap-fit structure to ensure the stability and durability of the interface component.

The circuit board component 2 further includes an NTC thermistor pad assembly 201 and a diode 202. The NTC thermistor pad assembly 201 is configured to monitor a circuit board temperature. In response to the temperature exceeding a threshold, the STC chip 207 is triggered to interrupt detection and issue an alarm. The diode 202 is connected in series with the detection branch 209 to provide reverse current protection, thereby enhancing the safety of the detector.

The power module 204 includes a DC-DC buck voltage regulator circuit. An input end of the DC-DC buck voltage regulator circuit is connected to the battery module 203, and an output end of the DC-DC buck voltage regulator circuit is connected to the IP2326 chip 206 to provide a stable voltage.

The detection branch 209 includes a plurality of independent detection channels. Each of the plurality of independent detection channels is switched to be connected to a different functional interface of the trailer light through a relay 210. The STC chip 207 controls an on-off state of the relay 210 based on an instruction input by the keys 23.

The antenna 21 is connected to a wireless communication module of the STC chip 207 and configured to transmit detection data to an external terminal device in real time.

A detection method comprises the following steps:

S1, connecting the detector to the trailer light through the small socket 3 or the large interface 4;

S2, selecting a type and a function mode of the trailer light to be detected by the keys 23, and the STC chip 207 controlling the relay 210 to switch to a corresponding detection channel;

S3, the detection branch 209 collecting a brightness, a flashing frequency and voltage data of the trailer light, and performing signal processing through the IP2326 chip 206; and S4. the STC chip 207 analyzing processed data to determine whether the trailer light operates normally, and sending a result to an external terminal through the antenna 21.

During the detection process, the detection branch 209 monitors the circuit board temperature in real time through the NTC thermistor pad assembly 201. In response to the temperature exceeding the threshold, the STC chip 207 is triggered to interrupt the detection and issue an alarm. The external terminal device receives the detection data through wireless communication and generates a detection report including a brightness curve, a frequency waveform and a fault code.

During the detection process, the detector maintains the stable output of the power module 204 through the DC-DC buck voltage regulator circuit to ensure the detection accuracy.

Through the above specific embodiments, the trailer light detector and the detection method of the present disclosure can accurately measure the key parameters of the trailer light, such as the brightness, the flashing frequency and the voltage, and are applicable to various types of trailer lights, and have the advantages of simple operation, easy carrying, high detection efficiency and good safety.

The operation principle and the use process of the present disclosure are as follows: the user first connects the detector to the trailer light to be detected through the small socket 3 or the large interface 4. Subsequently, the type of trailer light to be detected and its functional mode are selected using the keys 23 on the operation component. After receiving the instruction, the STC chip 207 controls the relay 210 to switch to the corresponding detection channel. The detection branch 209 then starts to collect the brightness, the flashing frequency and the voltage data of the trailer light, and performs signal processing on the data through the IP2326 chip 206. The STC chip 207 further analyzes the processed data to determine whether the operation state of the trailer light is normal. Once the detection is completed, the STC chip 207 transmits the detection result to the external terminal device in real time through the antenna 21, and the user can view the detection report containing the brightness curve, the frequency waveform and the fault code on the terminal device. The whole process is easy to operate, and the detection of the trailer light can be easily completed without the guidance of professionals.

The above description is only a preferred specific embodiment of the present disclosure, but the protection scope of the present disclosure is not limited thereto. Any technician familiar with the technical field can make equivalent replacements or changes according to the technical scheme and inventive concept of the present disclosure within the technical scope disclosed by the present disclosure, which should be covered by the protection scope of the present disclosure.

In the description of the present disclosure, it is necessary to understand that the terms "coaxial", "bottom", "one end", "top", "middle", "the other end", "upper", "one side", "top", "inside", "front", "center", "both ends", or the like, indicate orientations or positional relationships based on the orientations or positional relationships shown in the accompanying drawings, and are only for the convenience of describing the present disclosure and simplifying the description, and do not indicate or imply that the device or element referred to must have a specific orientation, be constructed and operated in a specific orientation, and therefore should not be understood as a limitation on the present disclosure.

In the present disclosure, unless otherwise clearly stipulated and limited, the terms such as "installation", "setting", "connection", "fixation" and "screw-on" should be understood in a broad sense. For example, it can be a fixed connection, a detachable connection, or an integral one; it can be a mechanical connection or an electrical connection; it can be a direct connection or an indirect connection through an intermediate medium; it can be the internal connection of two elements or the interaction relationship between two elements. Unless otherwise clearly defined, those having ordinary skills in the art can understand the specific meanings of the above terms in the present disclosure according to the specific circumstances.

According to the embodiments of the present disclosure as described above, these embodiments do not describe all the details in detail, nor do they limit the invention to specific embodiments. Obviously, many modifications and changes can be made based on the above description. This specification selects and specifically describes these embodiments to better explain the principles and practical applications of the present disclosure, so that those skilled in the art can make good use of the present disclosure and the modified use based on the present disclosure. Any modifications, equivalent substitutions, improvements, etc. made within the spirit and principles of the present disclosure should be included in the protection scope of the present disclosure.

The invention claimed is:

1. A trailer light detector applicable to multiple types, comprising:
    a housing component including a lower shell (11) and an upper shell (12) fixedly connected by assembly screws (13), wherein a handle holder (14) and a handle (15) detachably connected thereto are provided on a top of the housing;
    a circuit board component (2) disposed inside the housing, including a power module (204), a detection branch (209), a relay (210), a remote controller (211), an IP2326 chip (206), an STC chip (207), an antenna (21), a GND ground terminal (205) and a circuit module (208), wherein the power module (204) is electrically connected to a battery module (203), the detection branch (209) is connected to a trailer light interface through the relay (210), and the GND ground terminal (205) is fixedly connected to a ground circuit of the circuit board component (2) to provide stable ground protection;
    an operation component including a switch key (22), a plurality of keys (23) and a charging port (24) disposed on a surface of the housing, wherein the plurality of keys (23) are in signaling connection with the STC chip (207); and
    an interface component including a small socket (3) and a large interface (4); wherein a small socket protection cover (31) is disposed on an outer side of the small socket (3) and fixed by an anti-drop connection strip (32); and a large interface protection cover (41) and a protection cover base (42) are disposed on an outer side of the large interface (4).

2. The trailer light detector applicable to multiple types according to claim 1, wherein the circuit board component (2) further includes an NTC thermistor pad assembly (201) and a diode (202), the NTC thermistor pad assembly (201) is configured to monitor a circuit board temperature, and the diode (202) is connected in series with the detection branch (209) to provide reverse current protection.

3. The trailer light detector applicable to multiple types according to claim 1, wherein the power module (204) includes a DC-DC buck voltage regulator circuit, an input end of the DC-DC buck voltage regulator circuit is connected to the battery module (203), and an output end of the DC-DC buck voltage regulator circuit is connected to the IP2326 chip (206) to provide a stable voltage.

4. The trailer light detector applicable to multiple types according to claim 1, wherein: the detection branch (209) includes a plurality of independent detection channels, each of the plurality of independent detection channels is switched to be connected to a different functional interface of a trailer light through a relay (210), and the STC chip (207) controls an on-off state of the relay (210) based on an instruction input by the keys (23).

5. The trailer light detector applicable to multiple types according to claim 1, wherein the antenna (21) is connected to a wireless communication module of the STC chip (207) to transmit detection data to an external terminal device in real time.

6. The trailer light detector applicable to multiple types according to claim 1, wherein the small socket (3) and the large interface (4) are respectively adapted to different types of trailer light plugs, and the protection cover base (42) of the large interface (4) is fixed to the housing by a snap-fit structure.

\* \* \* \* \*